United States Patent
Naeve et al.

(10) Patent No.: US 8,525,050 B2
(45) Date of Patent: Sep. 3, 2013

(54) METHOD FOR TESTING MULTILAYER TABLETS IN A MULTIPLE ROTARY PRESS, THE TESTED TABLETS PRODUCED UNDER NORMAL OPERATION, WITH M LAYERS PRESSED AND THE M+1 LAYER SUCTIONED OFF AND THE TABLET FED TO THE TESTING STATION

(75) Inventors: Jan Naeve, Schattin (DE); Stefan Luedemann, Hamburg (DE)

(73) Assignee: Fette GmbH, Schwarzenbek (DE)

( * ) Notice: Subject to any disclaimer, the term of this patent is extended or adjusted under 35 U.S.C. 154(b) by 937 days.

(21) Appl. No.: 12/555,827

(22) Filed: Sep. 9, 2009

(65) Prior Publication Data

US 2010/0059292 A1  Mar. 11, 2010

(30) Foreign Application Priority Data

Sep. 9, 2008 (DE) .................. 10 2008 046 422

(51) Int. Cl.
*B30B 11/08* (2006.01)
*G01G 19/00* (2006.01)
*B29C 47/92* (2006.01)
*B29C 43/20* (2006.01)

(52) U.S. Cl.
USPC ............ 177/50; 264/40.4; 264/113; 425/140; 73/863; 73/863.91

(58) Field of Classification Search
USPC ....... 264/40.1–40.7, 109, 113, 255; 425/140; 177/50; 73/863, 863.91
See application file for complete search history.

(56) References Cited

U.S. PATENT DOCUMENTS

| | | | | |
|---|---|---|---|---|
| 3,921,821 A | * | 11/1975 | Champion et al. | 73/864.33 |
| 4,259,049 A | * | 3/1981 | Willich | 425/73 |
| 4,640,376 A | * | 2/1987 | Hinzpeter | 177/50 |
| 5,158,728 A | * | 10/1992 | Sanderson et al. | 264/113 |
| 5,322,655 A | * | 6/1994 | Ebey | 264/113 |
| 5,350,548 A | * | 9/1994 | Hinzpeter et al. | 264/40.4 |
| 7,981,352 B2 | * | 7/2011 | Hinzpeter et al. | 264/409 |
| 7,988,440 B2 | * | 8/2011 | Schmidt et al. | 425/150 |
| 2005/0013960 A1 | * | 1/2005 | Ozeki et al. | 428/43 |
| 2009/0152751 A1 | * | 6/2009 | Roemer et al. | 264/40.1 |

FOREIGN PATENT DOCUMENTS

| | | |
|---|---|---|
| DE | 10 2007 061 081 A1 | 6/2009 |
| GB | 936684 | 9/1963 |
| SU | 887263 | 12/1981 |

\* cited by examiner

*Primary Examiner* — Randy W Gibson
(74) *Attorney, Agent, or Firm* — Vidas, Arrett & Steinkraus, P.A.

(57) ABSTRACT

The invention is related to a method for testing multilayer tablets in a multiple rotary press, in which die holes of a circulating die plate are successively filled with tablet material of different layers in consecutive filling devices, and the tablet material is compressed layer after layer to pressed articles having n layers by means of synchronously circulating compression punches in compression stations respectively associated to the filling devices, and the pressed articles are subsequently ejected and unloaded in a unloading station.

8 Claims, 1 Drawing Sheet

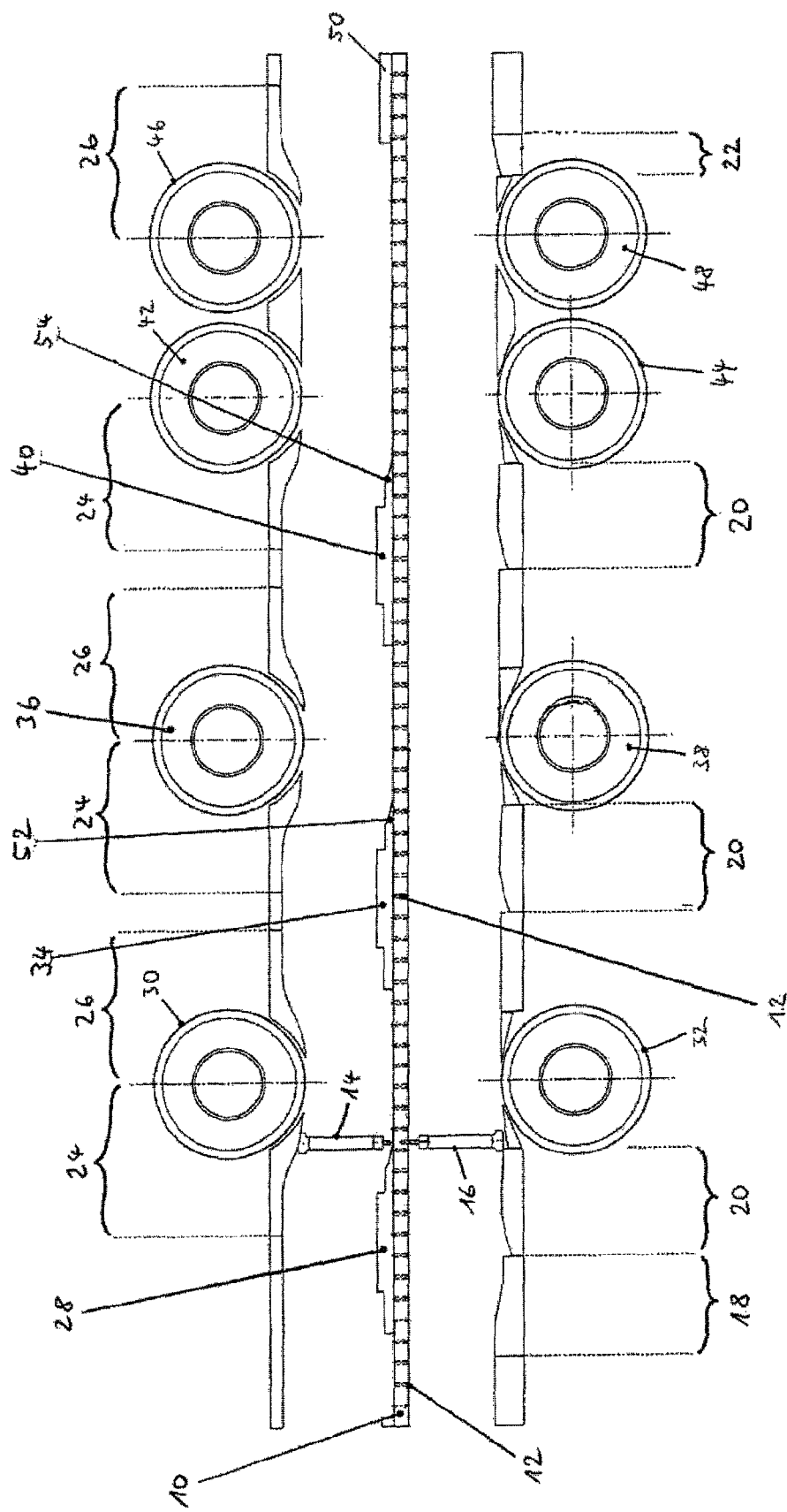

METHOD FOR TESTING MULTILAYER TABLETS IN A MULTIPLE ROTARY PRESS, THE TESTED TABLETS PRODUCED UNDER NORMAL OPERATION, WITH M LAYERS PRESSED AND THE M+1 LAYER SUCTIONED OFF AND THE TABLET FED TO THE TESTING STATION

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for testing multilayer tablets in a multiple rotary press, in which die holes of a circulating die plate are successively filled with tablet material of different layers in consecutive filling devices, and the tablet material is compressed layer after layer to pressed articles having n layers by means of synchronously circulating compression punches in compression stations respectively associated to the filling devices, and the pressed articles are subsequently ejected and unloaded in a unloading station, and wherein in a testing procedure, pressed articles having m layers are unloaded in an unloading station after the compression and are fed to a testing station, wherein $1 \leq m < n$.

Rotary tablet presses for producing tablets from very different materials and for the most different application purposes are commonly known. A die plate driven around a mostly vertical axis has dies arranged in a circle for this purpose, to which are associated pairs of compression punches circulating synchronously with the plate. The actuation of the compression punches takes place by radial cams and compression rollers. During the filling of the die holes with the usually powder-shaped tablet material by means of a suitable filling device, the lower punch of a pair forms the bottom of a moulding cavity, wherein its height in the die pre-sets the dosage. Subsequently, the compression of the tablet material to a desired height (the cylindrical height) takes place by moving the opposing compression punches towards each other in a compression station. The compression station has normally a pre-compression station and a main compression station. Following the compaction, the lower punches, controlled by an ejection cam, thrust the tablets out of the die at a certain position of the machine, while the opposing row of punches (the upper punches) gradually moves out of the die plate. Through this, a stripping device can strip off the ejected pressed articles from the die plate and supply them to a discharge channel.

For the manufacture of tablets having two or more layers with a rotary press of the mentioned kind, the respective described stations are provided repeatedly, according to the number of the envisioned layers. In this, a first layer is filled in a first filling device at first, and slightly compacted by means of the compression punches. Through the rotation of the die plate, the die hole filled with the first layer arrives at a subsequent filling device, in which the second layer is filled in above the first layer. This second layer is then slightly compacted again. This procedure is repeated for so long until the last layer of the tablet which is to be produced (the n-th layer) has been filled into the die hole. After filling with the last layer, the compression to a multilayer tablet takes place, with subsequent unloading from the apparatus, as has been explained.

There is the necessity to test amongst others the weight of the produced tablets, and to perform a correction as the case may be. Therefore, one or several discharge channels may be provided in the press with discharge distribution switches, which selectively direct arriving tablets into the direction of a testing station. Testing stations, in which the testing procedures are automatically performed, like a weight measurement for instance, are also already known. In order to be able to determine even in a multilayer tablet which one of the layers is defective when there is a deviation from a desired weight, there is the necessity to check the weight of individual layers of the tablet. A corresponding testing method for a double layer tablet is known from DE 42 18 122 C1, for instance. In this, pressed articles with the first layer are unloaded after the compression in a testing procedure and conveyed to a testing station, where the weight of the first layer is measured. In order to facilitate the ejection of the pressed article consisting of only one layer in this, and in order to prevent that uncompressed material is accumulated on the die plate and in the remaining area of the press, before the unloading for a test, the first layer of the pressed article is compressed more strongly than this is the case during the normal manufacture of the multilayer tablets.

Here, a problem arises in that the force conditions and with this the vibration behaviour of the tablet press are changed by the stronger compression. This in turn leads to a changed filling of the die holes with the individual layers and through this to changed layer weights. The measured weight of layer samples taken under these conditions is therefore not always representative for the tablets formed with the plant in the normal operation. According to the application with the serial number 10 2007 061081.7, also filed by the present applicant, this problem is resolved by unloading pressed articles having m layers for testing, by way of an unloading station arranged after the $m^{th}$ compression station and before the subsequent $(m+1)^{th}$ filling station. In this, only such pressed articles are supplied to the testing station, which had been completely filled with the tablet material of the $m^{th}$ layer already before the initiation of the testing procedure, i.e. which had already left the $m^{th}$ filling device. In this way, only layer samples are tested that are filled in a representative fashion. However, in this procedure the number of layer samples which is provided for testing is admittedly relatively small, because only pressed articles between the $m^{th}$ filling device and the unloading station arranged after the $m^{th}$ compression station and before the $(m+1)^{th}$ filling device can be used.

Starting from the state of the art that was set forth here, the present invention is based on the objective to produce representative layer samples that are not influenced by the process of taking samples in a method of the kind mentioned in the beginning, wherein the number of the usable layer samples is increased.

BRIEF SUMMARY OF THE INVENTION

For a method of the kind mentioned in the beginning, the present invention resolves the objective in that after the initiation of the testing procedure, die holes with pressed articles having m layers run through the $(m+1)^{th}$ filling device after the $m^{th}$ layer had been pressed, and there, tablet material of the $(m+1)^{th}$ layer is filled onto the pressed articles located in the die holes, that the tablet material of the $(m+1)^{th}$ layer is subsequently sucked off from the die holes containing the pressed articles having m layers by means of a suction device arranged after the $(m+1)^{th}$ filling device and before the $(m+1)^{th}$ compression station, and that only pressed articles from such die holes are fed to the test station that are situated between the $m^{th}$ filling device and the suction device in the moment of the initiation of the testing procedure.

The suction device may feature a suction nozzle. The suction device is activated at the initiation of the testing procedure and deactivated again after the end of the testing procedure. The testing procedure is initiated in that moment in which the press leaves its normal conditions of operation. For instance, this may be the initiation of a first compression of a tablet layer which is stronger than in the normal operation of the plant. The initiation of the testing procedure may also take place by braking down the die plate in the beginning of the testing procedure. Correspondingly, the end of the testing procedure is reached when the press has taken its normal conditions of operation again, for instance when the die plate braked down for ending the testing procedure is brought to its normal rotational speed again and/or the compression of the tablet layers takes place according to the normal plant operation again.

In contrast to the state of the art, according to the present invention the pressed articles to be tested are still guided through the filling device that follows the $m^{th}$ filling device. At this moment, the pressed articles are still in the die holes, like in the normal operation, and the tablet material of the $(m+1)^{th}$ layer is filled up on the pressed articles. Then, only the tablet material of the $(m+1)^{th}$ layer is sucked off by the suction device, whereas the pressed article remains in the die hole with m layers. After passing through the $(m+1)^{th}$ filling device and the associated suction device, only the pressed articles having m layers are situated in the die holes again. According to the present invention, all those pressed articles can be supplied to the testing station which are situated between the $m^{th}$ filling device and the suction device of the $(m+1)^{th}$ filling device. As compared to the state of the art, an increased number of layer samples are consequently available. In practice, more than twice as much layer samples can be achieved in this way. As a result, the test, for instance a measurement and possibly a regulation of weight, is based on a greater number of samples. Thus, the statistical accuracy of the test and as the case will be of the regulation is improved.

In case that pressed articles having m layers are to be tested, the pressed articles are produced layer after layer in the normal way until the $m^{th}$ filling device is reached. However, it is also possible to draw out a first tablet layer for testing on a first compression station, to draw out the first and the second layer in common on a second compression station, to draw out the first, the second and the third layer in common on a third compression station and so forth. It can be proceeded analogously for further layers. The weights of the individual layers can than be determined by calculating the difference of the respective measured weights. For instance, the weight of the second tablet layer results from the weight of the two layer sample, minus the weight of the first layer measured before.

One or more of the compression stations can feature a pre-compression station and a main compression station. In case that a pre-compression station exists, the arrangement of the suction device before a compression station means the arrangement before the pre-compression station. A stripping device can be provided at the unloading station, which supplies the pressed articles to an unloading channel. The latter on its turn can lead to the testing station. The tablet material is usually in powder form. According to a particularly practical embodiment, the weight of the pressed articles can be measured in the testing station.

The die plate can be stopped for the initiation of the testing procedure and/or for the termination of the testing procedure. In this manner, the parameters for the testing procedure can be adjusted in a simple way, for instance the cylindrical height can be adapted without that further pressed articles are unnecessarily compressed during the adaptation process, which would have to be sorted out thereafter. After the completion of the sample taking, the rotor with the die plate can be stopped again, so that the plant can be adjusted to its normal production parameters again. Thereafter, the rotor can be accelerated and the normal tablet production can be continued. Thus, the number of pressed articles which have to be sorted out is minimised.

The samples can be ejected and unloaded in an unloading station that is arranged behind the $(m+1)^{th}$ suction device. This unloading station can be arranged before a subsequent $(m+2)^{th}$ filling device, in particular be arranged directly behind the $(m+1)^{th}$ compression station. However, during the testing procedure it is also possible to suck off tablet material from all those filling devices that follow the $(m+1)$th filling device, by way of the suction devices respectively associated to these filling devices. In particular, the respectively suction devices can be arranged between the respective filling device and the respective compression station. In this embodiment, it is possible to eject and to unload the samples having m layers in an unloading station after the $n^{th}$ compression station intended for unloading the multilayer tablets having n layers. It is particularly advantageous that no separate unloading station for unloading the samples is necessary in this case. Instead, the last unloading station can be used that is provided in the press anyway.

Pressed articles from die holes which are not situated between the $m^{th}$ filling device and the $(m+1)^{th}$ suction device at the moment of the initiation of the testing procedure, can be fed to a channel for defective articles, for instance sorted out for disposal. For this purpose, a distributing guide can be provided in the unloading station, which leads to the channel for defective articles.

According to a further embodiment, before taking out the pressed articles, at least the $m^{th}$ layer can be compressed stronger than during the normal production of the multilayer tablets, wherein holds m<n. Such a stronger compression can be achieved by reducing the cylindrical height. By a stronger compression, the pressed articles are brought into a form which permits to test them without problems. In case that only a normal compression takes place, the pressed articles could otherwise break into parts or loose material. This would corrupt the test result. The stronger compression of the $m^{th}$ layer can be performed in the $(m+1)^{th}$ or a subsequent compression station. In this embodiment, more pressed articles are at hand for testing, because even such pressed articles are compressed stronger which are already located between the $m^{th}$ filling device and the $(m+1)^{th}$ compression station after the initiation of the testing procedure.

BRIEF DESCRIPTION OF THE VIEW OF THE DRAWING

FIG. 1 schematically shows a multiple rotary press for performing the method of the present invention in a side view.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated The rotary press has a die plate 10, which is driven rotatingly around a vertical axis. The die plate 10 has a row of passing through die holes 12. A pair of compression punches 14, 16 is assigned to each die hole 12, only one pair of them being depicted in the FIGURE for reasons of clarity. The upper compression punches 14 are axially movably mounted in a plate not shown in more detail, which is driven synchronously with the die plate 10. In a corresponding manner, the lower compression punches 16 are axially movably mounted in a plate, not shown in more detail, which also circulates synchronously. The axial position of the compression punches 14, 16 is determined by various radial cams, with which the rear ends of the compression punches 14, 16 co-operate in a per se known manner. Schematically depicted in the FIGURE are a filling cam 18, metering cams 20 as well as an ejection cam 22 as lower radial cams. Furthermore depicted are low compression cams 24 and pull-up cams 26 as upper radial cams. The realisation of such radial cams and their co-operation with the compression punches 14, 16 is per se known to those skilled in the art, and is therefore not explained in more detail.

In the following, the normal operation of the press for producing a three layer tablet is explained at first. In the FIGURE, a first filling station with a first filling device 28 is arranged above the die plate 10. Powder shaped tablet material for a first layer of a multilayer tablet to be produced in the press, presently a three layer tablet, is filled by means of the filling device 28 into the die holes 12 that pass along. The filling depth is determined by the position of the lower compression punches 16, whose position is in turn determined by the filling- and metering cams 18, 20 of lower radial cams. Actuated by the radial cams 18, 20, the lower compression punches 16 gradually unblock the die holes 12 which pass along. The die holes 12 filled in the filling device 28 subsequently pass through a first compression station with upper and lower compression rollers 30, 32, in the present case pre-compression rollers 30, 32. With the aid of the upper low compression cam 24, the upper compression punches 14 co-operate with the die holes 12. The degree about which the filled material in the die holes 12 will be compressed is given by the height of the pre-compression rollers 30, 32. The height of the pressed article obtained in this way is also designated as the cylindrical height.

Subsequently, the die holes 12 pass through a second filling device 34, in which tablet material for a second tablet layer is filled on the first layer in the die holes 12, and through a second compression station arranged after the second filling device 34, again with upper and lower compression rollers 36, 38, pre-compression rollers 36, 38 in particular. In the second compression station, there is a compression of the second tablet layer in the die holes 12 by the second pre-compression rollers 36, 38. Thereafter, the die holes 12 with the two tablet layers pass through a third filling device 40, in which tablet material of a third layer is filled into the die holes onto the two layers that are already present in the holes 12. After passing through this filling device 40, the die holes 12 are guided through a third compression station. The third compression station has a pre-compression station with upper and lower pre-compression rollers 42, 44 as well as a subsequent main compression station with upper and lower main compression rollers 46, 48. In the third compression station, there is the terminal compression of the three material layers into one pressed article having three tablet layers. Thereafter, the pressed articles in the die holes 12 in the region of the lower radial cam 22, which moves the lower punches 16 upward, are ejected from the die holes 12 to the surface of the die plate 10. By means of a stripping device 50, the pressed articles may then be supplied in a per se known manner to a discharge channel not shown in more detail, and be processed further from there on. Together with the discharge channel, the stripping device 50 forms an unloading station.

Below, the method of the present invention for testing multilayer tablets will be described, in particular a testing procedure for measuring the weight of the first layer of the pressed articles. In order to initiate the testing procedure, the die plate 10 is stopped at first. The suction device 52 is activated, as well as a further suction device 54 arranged between the third filling device 40 and the third compression station. In particular, the action of suction nozzles of the suction devices 52, 54 is started in doing so. By way of the suction devices 52, 54, powder-shaped material filled into the die holes 12 by the second and third filling device 34, 40 is sucked off before it can be compressed. In case that a stronger compression of the first layer is desired, the die plate 10 is at first moved further after the stop, about that number of die holes 12 which exist between a suction device 52 arranged after the second filling device 34 and before the second compression station. Subsequently, the cylindrical height formed by the second compression rollers 36, 38 is reduced in the desired way. Thus, a pressed article passing through the second compression station is compressed stronger than in the small pre-compression that takes place in the normal operation.

Subsequently, the die plate 10 is set into movement again. In particular, it is moved forward about that number of die holes 12 which are located between the first filling device 28 and the stripping device 50. In this, in fact it is continued to fill tablet material onto the pressed articles of the first layer in the second and third filling devices 34, 40 after the initiation of the testing procedure. However, this material is sucked off again by the suction devices 52, 54 before a compression can occur. Moreover, the pressed article having the first layer is subjected to a stronger compression in the second compression station. The stripping device 50 strips off the pressed articles that were conveyed to the surface of the die plate 10 to the respective discharge channel which is not shown in more detail.

In the present case, such pressed articles from the die holes 12 are used as samples for a testing procedure which were situated between the first filling device 28 and the suction device 52 associated to the second filling device 34 after the stop of the die plate 10. Those pressed articles from die holes 12 which were located between the suction device 52 and the stripping device 50 in the moment of the stop of the die plate 10, i.e. of the initiation of the testing procedure, are fed into a channel for defective articles by means of a distribution switch in the discharge channel, and sorted out. Subsequently, the distribution switch is changed over such that the pressed articles to be guided to the testing procedure are conveyed from the discharge channel to a testing station not shown in more detail, one for weight measurement in the present case.

After the last pressed article had been unloaded for the testing procedure, the die plate 10 is stopped again. The suction devices 52, 54 are shut down, the cylindrical heights are moved back into the operation position and the die plate 12 is accelerated to its normal operation speed again. In this, pressed articles that were ejected up to the arrival in the normal operation can be sorted out by way of the distribution switch in the discharge channel. In particular, only such pressed articles that were produced under normal conditions of operation are used for the normal production again.

In the method of the present invention, the number of the pressed article samples that are available for one testing procedure is increased. At the same time, it is made sure that representative layer samples are tested without being influenced by the testing procedure. Moreover, no separate layer ejector for unloading the pressed articles to be tested is necessary in the described embodiment of the method. Instead, the unloading station with the stripping device 50 can be used for this purpose, which is provided in the press anyway.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for testing multilayer tablets in a multiple rotary press, in which during normal operation:
   die holes of a circulating die plate of the press are successively filled with tablet material of different tablet layers in consecutive filling devices,
   the filled tablet material is compressed layer after layer to pressed articles having n layers by means of synchronously circulating compression punches in compression stations respectively associated to the filling devices, and the pressed articles are subsequently ejected and unloaded in a unloading station, wherein in a testing procedure, pressed articles having m layers are unloaded in an unloading station after the compression during normal operation and are fed to a testing station, wherein $1<=m<n$,
   initiating a testing procedure comprising the further steps of:
      after the initiation of the testing procedure, die holes (12) with pressed articles having m layers run through the $(m+1)^{th}$ filling device (34) after the $m^{th}$ layer had been pressed as during normal operation, and there, tablet material of the $(m+1)^{th}$ layer is filled onto the pressed articles located in the die holes (12) as during normal operation,
      that the tablet material of the $(m+1)^{th}$ layer is subsequently suctioned off from the die holes (12) containing the pressed articles having m layers by means of a suction device (52) arranged after the $(m+1)^{th}$ filling device (34) and before the $(m+1)^{th}$ compression station (36, 38), and
      that only pressed articles from such die holes (12) are fed to the test station that are situated between the $m^{th}$ filling device (28) and the suction device (52) in the moment of the initiation of the testing procedure so that only pressed articles made under normal operation are tested, so as to not be influenced by the testing procedure.

2. A method according to claim 1, characterised in that the weight of the pressed articles is measured in the testing station.

3. A method according to claim 1, characterised in that the die plate (12) is stopped for the initiation of the testing procedure and/or for the termination of the testing procedure.

4. A method according to claim 1, characterised in that during the testing procedure, tablet material from all the filling devices (40) that follow the $(m+1)^{th}$ filling device (34) is suctioned off by way of suction devices (54) respectively associated to the filling devices (40).

5. A method according to claim 1, characterised in that the test samples are ejected and unloaded in a unloading station (50) for the unloading of the multilayer tablets having n layers that is subsequent to the $n^{th}$ compression station (42, 44, 46, 48).

6. A method according to claim 1, characterised in that pressed articles from die holes (12) that are not situated between the $m^{th}$ filling device (28) and the $(m+1)^{th}$ suction device (52) in the moment of the initiation of the testing procedure are fed to a channel for defective articles.

7. A method according to claim 1, characterised in that before unloading the pressed articles, at least the $m^{th}$ layer is compressed stronger than during the normal production of the multilayer tablets, wherein holds $m<n$.

8. A method according to claim 7, characterised in that the stronger compression of the $m^{th}$ layer takes place in the $(m+1)^{th}$ compression station (36, 38) or in a subsequent compression station.

* * * * *